(12) United States Patent
Nguyen et al.

(10) Patent No.: US 10,424,003 B2
(45) Date of Patent: Sep. 24, 2019

(54) MANAGEMENT OF PHYSICAL ITEMS BASED ON USER ANALYTICS

(71) Applicant: Accenture Global Solutions Limited, Dublin (IE)

(72) Inventors: David T. Nguyen, San Jose, CA (US); Leeann Chau Tuyet Dang, San Jose, CA (US); Matthew Thomas Short, San Jose, CA (US)

(73) Assignee: Accenture Global Solutions Limited, Dublin (IE)

( * ) Notice: Subject to any disclaimer, the term of this patent is extended or adjusted under 35 U.S.C. 154(b) by 583 days.

(21) Appl. No.: 15/255,949

(22) Filed: Sep. 2, 2016

(65) Prior Publication Data

US 2017/0068909 A1 Mar. 9, 2017

Related U.S. Application Data

(60) Provisional application No. 62/214,562, filed on Sep. 4, 2015.

(51) Int. Cl.
*G06Q 30/02* (2012.01)
*G06Q 30/06* (2012.01)
(Continued)

(52) U.S. Cl.
CPC ....... *G06Q 30/0633* (2013.01); *G06F 3/0482* (2013.01); *G06F 3/0488* (2013.01); *G06F 3/04842* (2013.01); *G06F 16/29* (2019.01); *G06F 16/5866* (2019.01); *G06F 16/9537* (2019.01); *G06K 9/6288* (2013.01); *G06Q 10/02* (2013.01); *G06Q 30/0202* (2013.01);
(Continued)

(58) Field of Classification Search
CPC ............... G06Q 10/02; G06Q 30/0202; G06Q 30/0605; G06Q 30/0633
See application file for complete search history.

(56) References Cited

U.S. PATENT DOCUMENTS

| | | |
|---|---|---|
| 7,315,887 B1 | 1/2008 | Liang et al. |
| 7,523,132 B2 | 4/2009 | Altounian et al. |
| (Continued) | | |

OTHER PUBLICATIONS

Blake, Measuring the Effectiveness of a Retail Window Display, chron.com WebArchive copy dated Mar. 4, 2012.*

*Primary Examiner* — Daniel Vetter
(74) *Attorney, Agent, or Firm* — Fish & Richardson P.C.

(57) ABSTRACT

Methods, systems, and apparatus, including computer programs encoded on computer storage media, for management of physical items. A method includes actions of receiving, for each of a plurality of users, a list that identifies types of items that are indicated as of interest to the user, determining a particular item that is likely of interest to the plurality users, receiving, for each of the plurality of users, reservation information that indicates a particular geographic area and a corresponding time that the user is scheduled to visit, determining that each of the plurality of users is scheduled to visit at a particular time period, identifying a facility physically located in or nearby the particular geographic area, determining that the particular item is not presented in a particular area of the facility at the particular time period, and generating instructions to cause the particular item to be presented.

20 Claims, 3 Drawing Sheets

(51) Int. Cl.
*G06K 9/62* (2006.01)
*G06F 3/0488* (2013.01)
*G06F 16/29* (2019.01)
*G06F 16/58* (2019.01)
*G06F 16/9537* (2019.01)
*G06Q 10/02* (2012.01)
*G06Q 50/12* (2012.01)
*G06F 3/0482* (2013.01)
*G06F 3/0484* (2013.01)

(52) U.S. Cl.
CPC ......... *G06Q 30/0261* (2013.01); *G06Q 50/12* (2013.01); *G06K 2209/27* (2013.01); *G06Q 30/0605* (2013.01)

(56) References Cited

U.S. PATENT DOCUMENTS

| | | | | |
|---|---|---|---|---|
| 7,725,366 | B1* | 5/2010 | Franco | G06Q 10/08 705/27.1 |
| 8,065,385 | B2 | 11/2011 | Altounian et al. | |
| 8,620,864 | B2 | 12/2013 | Altounian et al. | |
| 2003/0212619 | A1* | 11/2003 | Jain | G06Q 30/02 705/35 |
| 2004/0193478 | A1* | 9/2004 | Miller | G06Q 10/06 705/7.31 |
| 2005/0049914 | A1* | 3/2005 | Parish | G06Q 20/10 705/14.26 |
| 2006/0122881 | A1* | 6/2006 | Walker | G06Q 10/087 705/14.13 |
| 2007/0182758 | A1 | 8/2007 | Altounian et al. | |
| 2007/0182760 | A1 | 8/2007 | Altounian et al. | |
| 2007/0198488 | A1 | 8/2007 | Altounian et al. | |
| 2008/0288332 | A1 | 11/2008 | Altounian et al. | |
| 2010/0023542 | A1 | 1/2010 | Devanathan et al. | |
| 2010/0179857 | A1* | 7/2010 | Kalaboukis | G06Q 20/203 705/7.31 |
| 2012/0084349 | A1* | 4/2012 | Lee | G06Q 30/02 709/203 |
| 2014/0214547 | A1* | 7/2014 | Signorelli | G06Q 30/0267 705/14.64 |
| 2015/0127483 | A1* | 5/2015 | Elliot | G06Q 30/0633 705/26.8 |
| 2015/0206188 | A1* | 7/2015 | Tanigawa | G06Q 30/0261 705/14.58 |
| 2016/0086249 | A1* | 3/2016 | Zamer | G06Q 30/0631 705/26.7 |
| 2016/0125358 | A1 | 5/2016 | Kushner et al. | |
| 2016/0180392 | A1* | 6/2016 | Liu | G06Q 30/0255 705/14.53 |
| 2016/0224503 | A1 | 8/2016 | Vanoverschelde et al. | |
| 2016/0353235 | A1* | 12/2016 | Williams | H04W 4/02 |

* cited by examiner

MANAGEMENT OF PHYSICAL ITEMS BASED ON USER ANALYTICS

CROSS REFERENCE TO RELATED APPLICATION

This application claims the benefit of U.S. Provisional Application Ser. No. 62/214,562, filed on Sep. 4, 2015, which is incorporated by reference.

BACKGROUND

How items are displayed may affect whether or not users obtain the items. For example, items that are visible to users may be more likely to be obtained by users.

SUMMARY

In general, an aspect of the subject matter described in this specification may involve a system for management of physical items. The system may manage the presentation of items at facilities based on information that indicates scheduled visits of users and indicators of interest in item types provided by the users. For example, the system may determine that many users are likely to be interested in a particular item and be at a particular location at a particular time, and in response, provide instructions to a robot in a facility near the particular location to place the particular item in an area of the facility that would be easily seen by the users.

In general, one innovative aspect of the subject matter described in this specification can be embodied in methods that include the actions of receiving, for each of a plurality of users, a list that identifies types of items that are indicated as of interest to the user, determining, from the lists that indicate types of items that are indicated as of interest to the plurality of users, a particular item that is likely of interest to the plurality users, and receiving, for each of the plurality of users, reservation information that indicates a particular geographic area and a corresponding time that the user is scheduled to visit the particular geographic area. Additional actions include determining, from the reservation information, that each of the plurality of users is scheduled to visit the particular geographic area at a particular time period, identifying a facility physically located in or nearby the particular geographic area and from which a user may obtain the particular item that is likely of interest to the users, determining that the particular item is not presented in a particular area of the facility at the particular time period, and in response to determining that the particular item is not presented in a particular area of the facility at the particular time period, generating instructions to cause the particular item to be presented in the particular area of the facility at the particular time period.

Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. In certain aspects, determining, from the lists that indicate types of items that are indicated as of interest to the plurality of users, a particular item that is likely of interest to the plurality users includes determining that a particular type of item is likely of interest to a threshold number of the plurality users and determining that the particular item corresponds to the particular type of item. In some aspects, determining, from the reservation information, that each of the plurality of users is scheduled to visit the particular geographic area at a particular time period includes determining that the plurality of users is scheduled to visit a second facility at the particular time and determining a geographic area corresponding to the second facility as the particular geographic area. In some implementations, determining that the particular item is not presented in a particular area of the facility at the particular time period includes obtaining presentation information that indicates items that are presented in the particular area of the facility at the particular time period and determining from the presentation information that the particular item is not presented in the particular area of the facility at the particular time period.

In certain aspects, generating instructions to cause the particular item to be presented in the particular area of the facility at the particular time period includes providing an instruction to a robot at the facility that causes the robot place the particular item in the particular area of the facility before the particular time period. In some aspects, the reservation information indicates one or more theme park rides that the user has made a reservation to ride at the corresponding time. In some implementations, the reservation information indicates one or more restaurants that the user has made a reservation to dine in at the corresponding time. In certain aspects, the list that identifies types of items that are indicated as of interest to the user includes a wish-list of items of interest to the user.

The subject matter described in this specification can be implemented in particular embodiments and may result in one or more of the following advantages. One advantage may be that users may more easily obtain items. For example, when seeing the items the users may be less likely to forget they were interested in the item. In another example, the system may ensure that items that users may be interested in are made available at facilities that the users will be near so that the users may actually obtain the items. In yet another example, the system may cause items to be presented in particular areas that are more readily accessible by the user so that the items are more readably obtainable by the user.

The details of one or more implementations of the subject matter described in this specification are set forth in the accompanying drawings and the description below. Other features, aspects, and advantages of the subject matter will become apparent from the description, the drawings, and the claims.

DETAILED DESCRIPTION

Figure 1:
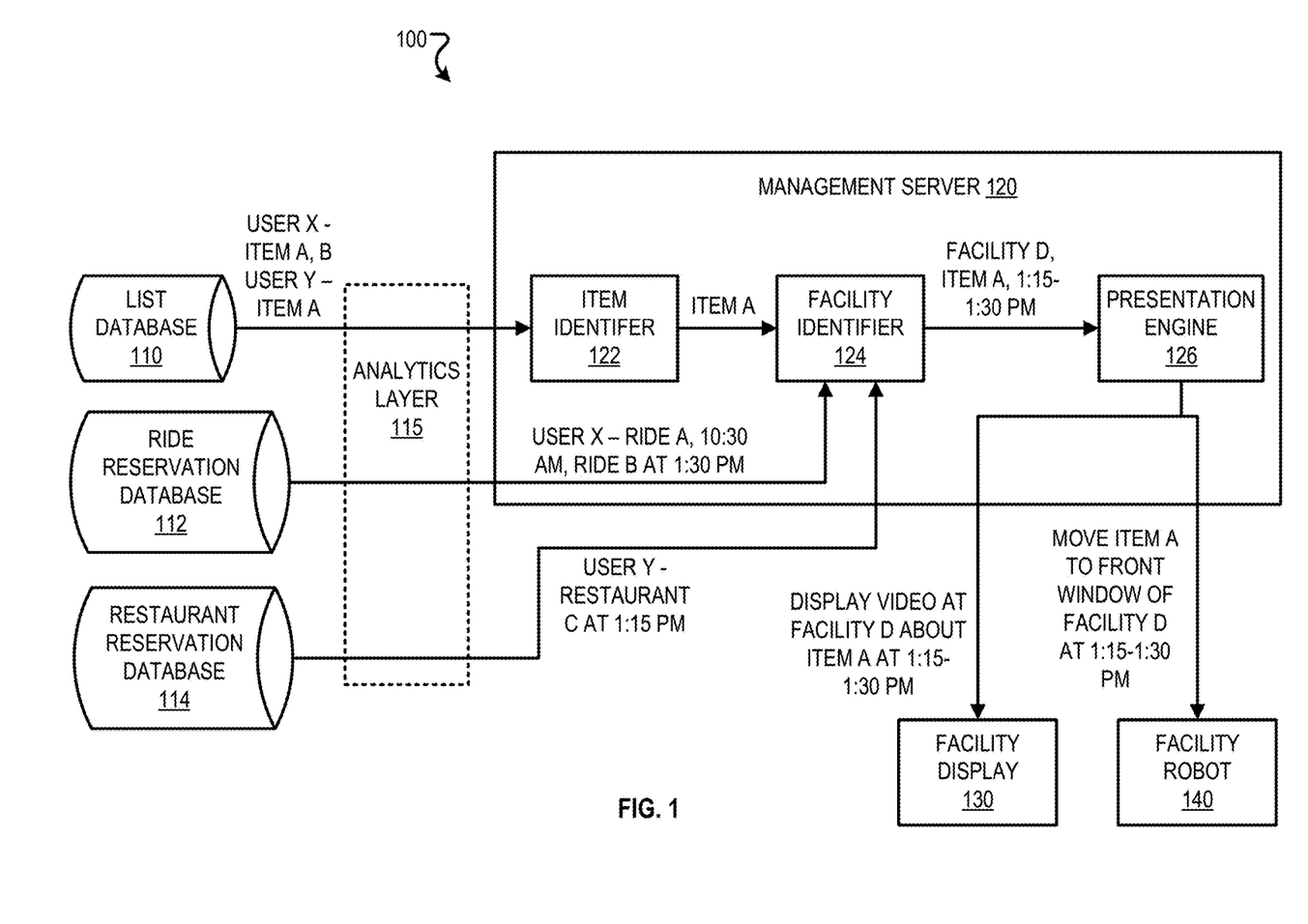
FIG. 1 is a block diagram of an example system that manages physical items.

FIG. 1 is a block diagram of an example system 100 that manages physical items. Briefly, and as described in further detail below, the system 100 may include a list database 110, a ride reservation database 112, a restaurant reservation database 114, a management server 120 that includes an item identifier 120, a facility identifier 130, and a presentation engine 140, a facility display 130, and a facility robot 140.

The list database 110 may store multiple lists. Each of the lists may identify types of items that are indicated as of interest to a user. For example, a first list may indicate that items A and B have been indicated as of interest to User X and a second list may indicate that item A is of interest of User Y. The lists may be item wishlists that identify items that are placed on item wishlists by the users. For example, User Y may have previously viewed item A in a graphical user interface and then interacted with control elements of the graphical user interface to place item A on the wishlist of the user.

The ride reservation database 112 may store ride reservation information for users. The ride reservation information may indicate particular users, particular rides, and particular times. For example, the ride reservation information may indicate that User X has made a reservation on ride A at 10:30 AM and ride B at 1:30 PM. The rides may be associated with particular geographic areas. For example, ride A may be in a first geographic area of a theme park and ride B may be in a second, different geographic area of the theme park. Accordingly, the ride reservation information may indicate, for each user, a particular geographic area and a corresponding time that the user is scheduled to visit the particular geographic area.

The restaurant reservation database 114 may store restaurant reservation information for users. The restaurant reservation information may indicate particular users, particular restaurants, and particular times. For example, the ride reservation information may indicate that User Y has made a reservation at restaurant C at 1:15 PM. The restaurants may be associated with particular geographic areas. For example, restaurant C may be in a first geographic area of a theme park and restaurant D may be in a second, different geographic area of the theme park. Accordingly, the restaurant reservation information may indicate, for each user, a particular geographic area and a corresponding time that the user is scheduled to visit the particular geographic area.

The management server 120 may receive the lists, the ride reservation information, and the restaurant reservation information, and provide instructions to the facility robot 140. In more detail, the item identifier 122 of the management server 120 may receive the lists from the list database 110 and, based on the lists, identify a particular item that is likely of interest to the users. For example, the item identifier 122 may obtain a list that identifies that user X has indicated interest in items A and B and that user Y has indicated interest in item A. In response, the item identifier 122 may identify item A as likely of interest to users.

In some implementations, the item identifier 122 may identify particular items based on determining that the lists identify that a predetermined percentage of users have indicated interest in a particular type of item. For example, the item identifier 122 may identify items that more than 30%, 50%, 80%, or some other predetermined percentage of users having indicated interest. In some implementations, the item identifier 122 may consider only lists of users that are visiting during a particular time period. For example, the item identifier 122 may consider only lists of users that are visiting a theme park during the next day.

In some implementations, the item identifier 122 may identify particular items based on determining that a predetermined number of users have indicated interest in a particular type of item. For example, the item identifier may identify particular items based on determining that at least a hundred, a thousand, ten thousand, or some other predetermined number of users having indicated interest. In some implementations, the item identifier 122 may identify particular items based on matching the particular items with types of items. For example, the item identifier 122 may determine that a predetermined percentage of users have indicated interest in a type of item, then determine that a particular item belongs to that type of item, and, in response, identify the item.

The facility identifier 124 may receive an indication of the particular item identified by the item identifier 122, ride reservation information from the ride reservation database 112, and restaurant reservation information from the restaurant reservation database 114 and, in response, identify a particular facility and particular time period. For example, the facility identifier 124 may obtain an identification of item A as likely of interest to users A and B, ride reservation information that indicates that user A is scheduled to visit ride B at 1:30 PM, and restaurant reservation information that indicates that user B is scheduled to visit restaurant C at 1:15 PM. In response, the facility identifier 124 may identify facility D and a time period of 1:00-1:30 PM.

In identifying a particular facility, the facility identifier 124 may initially identify users for which the particular item is likely of interest and then determine that those users are scheduled to visit a particular geographic area at a particular time period. For example, the facility identifier 124 may determine that users are scheduled to visit a particular geographic area that includes ride B and restaurant C between 1:15 PM and 1:30 PM. Accordingly, the facility identifier 124 may conserve processing that would be wasted on considering reservation information of users that are not likely interested in obtaining the particular item.

The facility identifier 124 may determine that users are scheduled to visit a particular geographic area at a particular time period based on determining geographic locations corresponding to reservations of the users, then determining whether the geographic locations are within a threshold distance, and then determining whether the reservations are within a threshold time difference. For example, the facility identifier 124 may determine that ride B is in a first location, that restaurant C is located in a second location, that the first location and the second location are within 50 feet, 100 feet, 400 feet, or some other distance of one another. In response, the facility identifier 124 may further determine that the reservations are within five minutes, fifteen minutes, thirty minutes, or some other time difference of one another and determine that facility D is near the first and second location. In response, the facility identifier 124 may further identify facility D.

In some implementations, the facility identifier 124 may identify facilities based on whether a particular item is available from the facilities. For example, after the facility identifier 124 determines that facility D is near the first and second location, the facility identifier 124 may determine whether the particular item is available from the facility D, and, if not, consider a next closest facility, and if so, identify facility D.

The facility identifier 124 may identify a time period based on the reservation times. For example, after the facility identifier 124 identifies facility D, the facility identifier 124 may then identify the time period 1:15-1:30 PM based on determining that time period is the shortest time period that includes both the restaurant reservation at 1:15 PM and the ride reservation at 1:30 PM.

In some implementations, the facility identifier 124 may also consider estimated completion times in identifying a facility and time period. For example, the facility identifier 124 may determine an estimated completion time for a user to get in line for a line and finish taking the ride, and then consider the user as being scheduled to be at the particular location of the ride from the scheduled reservation time until the estimated completion time for the ride has elapsed. In another example, the facility identifier 124 may determine an estimated completion time for a user to order and finish eating at a restaurant, and then consider the user as being scheduled to be at the particular location of the restaurant from the scheduled reservation time until the estimated completion time for the restaurant has elapsed.

The presentation engine 126 may receive an indication of the facility and time period identified by the facility identifier 124 and the particular item identified by the item identifier 122, and, in response, generate instructions to cause the particular item to be presented in a particular area of the facility during the time period. For example, the presentation engine 126 may receive an indication of facility D, item A, and a time period of 1:15-1:30 PM and, in response, generate instructions that cause the facility robot 140 to move the item to a front window of facility D from 1:15-1:30 PM.

The presentation engine 126 may generate the instructions based on determining whether the particular item will be presented in a particular area of the facility at the particular time period. For example, the presentation engine 126 may determine whether item A is scheduled to be in a front window of facility D from 1:15-1:130 PM. In response to determining that the particular item will be presented in the particular area of the facility at the particular time period, the presentation engine 126 may take no further action. In response to determining that the particular item will not be presented in the particular area of the facility at the particular time period, the presentation engine 126 may generate instructions for the facility robot 140 to move the particular item to the particular area of the facility shortly before the particular time period.

In some implementations, the presentation engine 126 may determine whether a particular item will not be presented in the particular area of the facility at the particular time period based on item presence sensors in the facility. For example, facility D may include sensors that can determine, e.g., via RFID, image recognition, or some other method, what items are currently presented in the front window of facility D and provide indications of the items currently presented in the front window of facility D to the presentation engine 126.

In some implementations, after the presentation engine 126 determines that the particular item will not be presented in the particular area of the facility at the particular time period, the presentation engine 126 may determine whether a predetermined number of other items that are likely to be of more interest will be in the particular area. For example, the presentation engine 126 may determine whether one, five, ten, or some other number of items that are likely of interest to more users than item A are already scheduled to be presented in a front window of a facility. In response to determining that a predetermined number of other items that are likely to be of more interest will be in the particular area, the presentation engine 126 may take no further action. In response to determining that a predetermined number of other items that are likely to be of more interest will not be in the particular area, the presentation engine 126 may then generate instructions for the facility robot 140 to move the particular item to the particular area of the facility shortly before the particular time period.

The facility robot 140 may receive the instructions from the presentation engine 126 and, in response, move the particular item to be in the particular area of the facility during the particular time period. For example, the facility robot 140 at facility D may obtain instructions that indicate to move item A so that item A is in the front window at 1:15 PM and then remove item A at 1:30 PM. In response, the facility robot 140 may automatically begin moving item A at 1:14 PM so it's in the front window at 1:15 and at 1:30 then move item A from the front window back to its prior location. The facility robot 140 may be a motorized robot that is capable of moving items within a facility. In some implementations, the instructions from the presentation engine 126 may additionally or alternatively be provided on a device within the identified facility and the device may then present the instructions to personnel within the facility to cause the personnel to move the particular item in accordance with the instructions presented by the device.

In some implementations, the presentation engine 126 may additionally or alternatively generate instructions for the facility display 130. For example, the presentation engine 126 may generate instructions to display a video about item A at facility D between 1:15-1:30 PM. The facility display 130 may receive the instructions and, in response, display the video about item A between 1:15-1:30 PM. The facility display 130 may be a liquid crystal display that is capable of displaying images or videos.

Additionally or alternatively, in some implementations the facility identifier 124 may determine that additional items of a particular type should be moved to a facility. For example, the facility identifier 124 may determine that a facility is near a location that multiple users with an interest in a particular item are scheduled to visit but that the facility is estimated to have a low stock of the particular item at the time of the scheduled visit. In response, the facility identifier 124 may provide instructions to increase stock of the particular item in the facility before the scheduled visit. For example, the facility identifier 124 may provide instructions to a supply management system to automatically delivery additional stock of the particular item to the facility.

In some implementations, the system 100 may include an analytics layer 115. The analytics layer 115 may receive data from the list database 110, the ride reservation database 112, the restaurant reservation database 114, perform optimization based on the data, and provide data to the corresponding portions of the management server 120 as described above. Optimization performed by the analytics layer 115 may include filtering data that is no longer relevant, weighting data based on relevancy, compressing data, or other optimizations.

Figure 2:
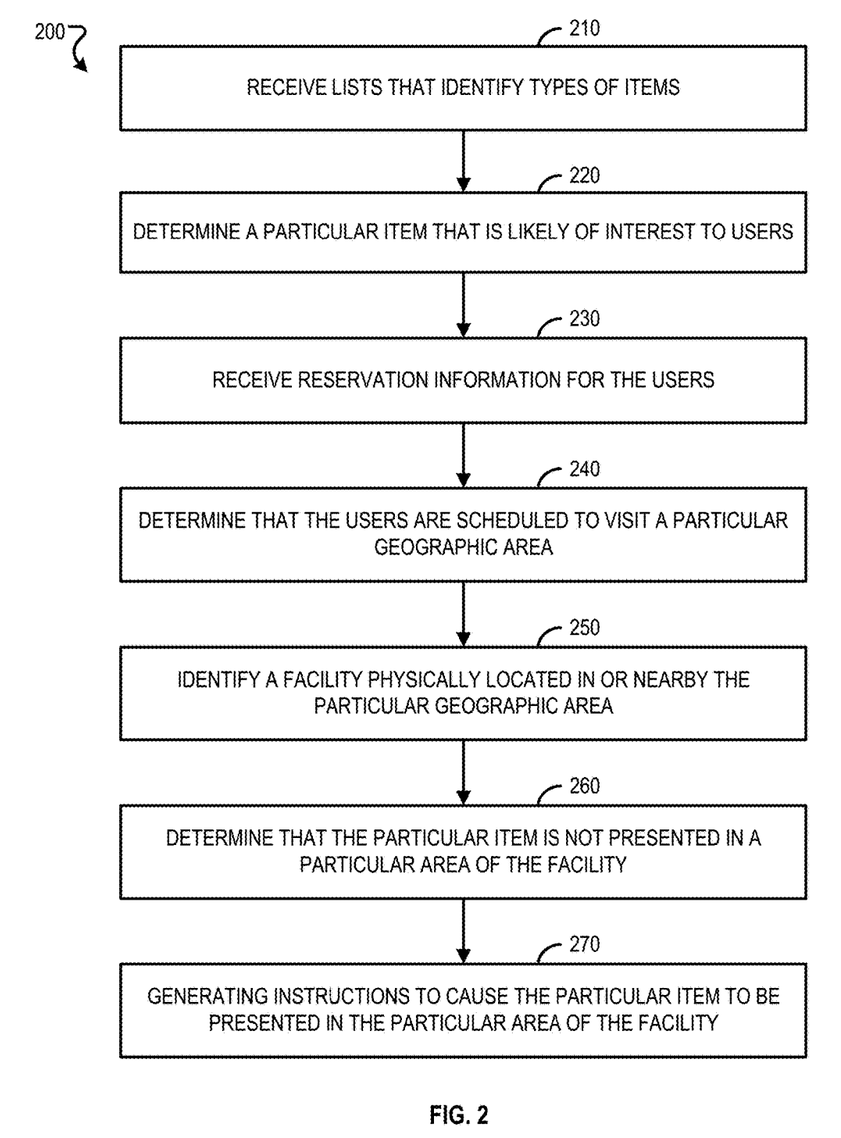
FIG. 2 is a flowchart of an example process that manages physical items.

FIG. 2 is a flowchart of an example process 200 that can execute implementations of the present disclosure. The following describes the process 200 as being performed by components of the system 100 that are described with reference to FIG. 1. However, the process 200 may be performed by other systems or system configurations.

The process 200 may include receiving lists that identify types of items (210). For example, the item identifier 122 may obtain a list of user X that identifies items of type A and B have been indicated as of interest to user X and a list of user Y that identifies items of type B and C have been indicated as of interest to user Y.

The process 200 may include determining a particular item that is likely of interest to users (220). For example, the item identifier 122 may determine that the list of user X identifies items of type B and the list of user Y also identifies items of type B and, in response, identify that item C is of type B and, in response, determine that item C is likely of interest to users X and Y.

The process 200 may include receiving reservation information for the users (230). For example, the facility identifier 124 may receive ride reservation information from the ride reservation database 112 that indicates that user X is scheduled at 10:00 AM to visit a particular location including ride A and restaurant reservation information from the restaurant reservation database 114 that indicates that user Y is scheduled at 10:00 AM to visit a particular location that includes restaurant B.

The process may include determining that the users are scheduled to visit a particular geographic area (240). For example, the facility identifier 124 may determine that both user X and user Y are scheduled to visit a particular geographic area that includes the location of ride A and the location of restaurant B at 10:00 AM. In some implementations, the facility identifier 124 may determine that the users are scheduled to visit a particular geographic area based on determining locations for the reservations are within a predetermined distance from one another. For example, the facility identifier 124 may determine that ride A is at a first location, determine that restaurant B is at a second location, determine that the first location and the second location are within 50 feet, 100 feet, or 500 feet, and in response, determine that users are scheduled to visit a particular geographic area that includes the first location and the second location.

The process may include identifying a facility physically located in or nearby the particular geographic area (250). For example, the facility identifier 240 may identify that facility D is within the particular geographic area that the users are scheduled to visit. In some implementations, the facility identifier 240 may identify a facility based on determining that the particular item that is likely of interest to users is available from the facility. For example, the facility identifier 240 may identify all facilities within the particular geographic area, then determine whether each of the facility has the particular item available for users to obtain, and then identify a particular facility that has the particular item available.

The process may include determining that the particular item is not presented in a particular area of the facility (260). For example, the presentation engine 126 may receive indications of facility D, item C, and time of 10:00 AM and, in response, determine that item C is not presented at a checkout counter of facility D at 10:00 AM. In some implementations, the presentation engine 126 may determine that the particular item is not presented in the particular area of the facility based on indications of items presented in the particular area of the facility that are determined based on sensor data generated by sensors at the facility.

The process includes generating instructions to cause the particular item to be presented in the particular area of the facility (270). For example, the presentation engine 126 may generate instructions to cause the facility robot 140 to move item C to a front window of facility D.

Figure 3:
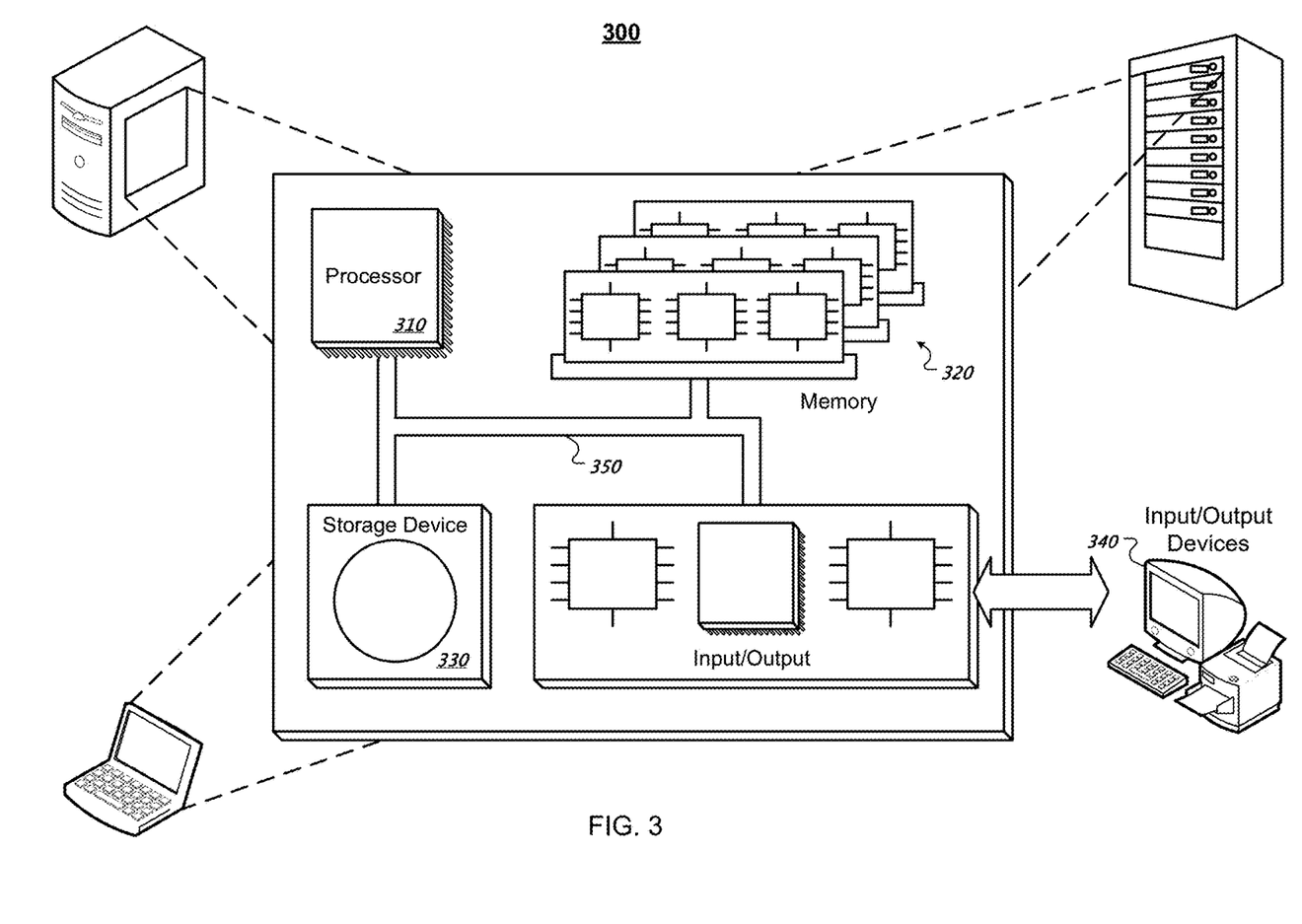
FIG. 3 illustrates a schematic diagram of an exemplary generic computer system.

FIG. 3 illustrates a schematic diagram of an exemplary generic computer system. The system 300 can be used for the operations described in association with the processes 200 according to some implementations. The system 300 may be included in the system 100.

The system 300 includes a processor 310, a memory 320, a storage device 330, and an input/output device 340. Each of the components 310, 320, 330, and 340 are interconnected using a system bus 350. The processor 310 is capable of processing instructions for execution within the system 300. In one implementation, the processor 310 is a single-threaded processor. In another implementation, the processor 310 is a multi-threaded processor. The processor 310 is capable of processing instructions stored in the memory 320 or on the storage device 330 to display graphical information for a user interface on the input/output device 340.

The memory 320 stores information within the system 300. In one implementation, the memory 320 is a computer-readable medium. In one implementation, the memory 320 is a volatile memory unit. In another implementation, the memory 320 is a non-volatile memory unit.

The storage device 330 is capable of providing mass storage for the system 300. In one implementation, the storage device 330 is a computer-readable medium. In various different implementations, the storage device 330 may be a floppy disk device, a hard disk device, an optical disk device, or a tape device.

The input/output device 340 provides input/output operations for the system 400. In one implementation, the input/output device 340 includes a keyboard and/or pointing device. In another implementation, the input/output device 340 includes a display unit for displaying graphical user interfaces.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the user device, which acts as a client. Data generated at the user device, e.g., a result of the user interaction, can be received from the user device at the server.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

For situations in which the systems discussed here collect personal information about users, or may make use of personal information, the users may be provided with an opportunity to control whether programs or features collect personal information (e.g., information about a user's social network, social actions or activities, profession, a user's preferences, or a user's current location), or to control whether and/or how to receive content from the content server that may be more relevant to the user. In addition, certain data may be anonymized in one or more ways before it is stored or used, so that personally identifiable information is removed. For example, a user's identity may be anonymized so that no personally identifiable information can be determined for the user, or a user's geographic location may be generalized where location information is obtained (such as to a city, ZIP code, or state level), so that a particular location of a user cannot be determined. Thus, the user may have control over how information is collected about him or her and used by a content server.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method comprising:
   receiving, for each of a plurality of users, a list that identifies types of items that are indicated as of interest to the user;
   determining, from the lists that indicate types of items that are indicated as of interest to the plurality of users, a particular item that is indicated as of interest to the plurality users;
   receiving, for each of the plurality of users, reservation information that indicates a particular geographic area and a corresponding time that the user is scheduled to visit the particular geographic area;
   determining, from the reservation information, that each of the plurality of users is scheduled to visit the particular geographic area at a particular time period;
   identifying a facility physically located in or within a threshold distance of the particular geographic area and from which a user may obtain the particular item that is indicated as of interest to the users;
   determining that the particular item is not presented in a particular area of the facility at the particular time period; and
   in response to determining that the particular item is not presented in a particular area of the facility at the particular time period, providing an instruction to a robot at the facility that causes the robot to place the particular item in the particular area of the facility before the particular time period.

2. The method of claim 1, wherein determining, from the lists that indicate types of items that are indicated as of interest to the plurality of users, a particular item that is indicated as of interest to the plurality users comprises:
   determining that a particular type of item is indicated as of interest to a threshold number of the plurality users; and
   determining that the particular item corresponds to the particular type of item.

3. The method of claim 1, wherein determining, from the reservation information, that each of the plurality of users is scheduled to visit the particular geographic area at a particular time period comprises:
   determining that the plurality of users is scheduled to visit a second facility at the particular time; and
   determining a geographic area corresponding to the second facility as the particular geographic area.

4. The method of claim 1, wherein determining that the particular item is not presented in a particular area of the facility at the particular time period comprises:
   obtaining presentation information that indicates items that are presented in the particular area of the facility at the particular time period; and
   determining from the presentation information that the particular item is not presented in the particular area of the facility at the particular time period.

5. The method of claim 1, wherein the reservation information indicates one or more theme park rides that the user has made a reservation to ride at the corresponding time.

6. The method of claim 1, wherein the reservation information indicates one or more restaurants that the user has made a reservation to dine in at the corresponding time.

7. The method of claim 1, wherein the list that identifies types of items that are indicated as of interest to the user comprises a wish-list of items of interest to the user.

8. A system comprising:
   one or more computers and one or more storage devices storing instructions that are operable, when executed by the one or more computers, to cause the one or more computers to perform operations comprising:
   receiving, for each of a plurality of users, a list that identifies types of items that are indicated as of interest to the user;
   determining, from the lists that indicate types of items that are indicated as of interest to the plurality of users, a particular item that is indicated as of interest to the plurality users;
   receiving, for each of the plurality of users, reservation information that indicates a particular geographic area and a corresponding time that the user is scheduled to visit the particular geographic area;
   determining, from the reservation information, that each of the plurality of users is scheduled to visit the particular geographic area at a particular time period;
   identifying a facility physically located in or within a threshold distance of the particular geographic area and from which a user may obtain the particular item that is indicated as of interest to the users;
   determining that the particular item is not presented in a particular area of the facility at the particular time period; and
   in response to determining that the particular item is not presented in a particular area of the facility at the particular time period, providing an instruction to a robot at the facility that causes the robot to place the particular item in the particular area of the facility before the particular time period.

9. The system of claim 8, determining, from the lists that indicate types of items that are indicated as of interest to the plurality of users, a particular item that is indicated as of interest to the plurality users comprises:
   determining that a particular type of item is indicated as of interest to a threshold number of the plurality users; and
   determining that the particular item corresponds to the particular type of item.

10. The system of claim 8, wherein determining, from the reservation information, that each of the plurality of users is scheduled to visit the particular geographic area at a particular time period comprises:
    determining that the plurality of users is scheduled to visit a second facility at the particular time; and determining a geographic area corresponding to the second facility as the particular geographic area.

11. The system of claim 8, wherein determining that the particular item is not presented in a particular area of the facility at the particular time period comprises:
   obtaining presentation information that indicates items that are presented in the particular area of the facility at the particular time period; and
   determining from the presentation information that the particular item is not presented in the particular area of the facility at the particular time period.

12. The system of claim 8, wherein the reservation information indicates one or more theme park rides that the user has made a reservation to ride at the corresponding time.

13. The system of claim 8, wherein the reservation information indicates one or more restaurants that the user has made a reservation to dine in at the corresponding time.

14. The system of claim 8, wherein the list that identifies types of items that are indicated as of interest to the user comprises a wish-list of items of interest to the user.

15. A non-transitory computer-readable medium storing software comprising instructions executable by one or more computers which, upon such execution, cause the one or more computers to perform operations comprising:
   receiving, for each of a plurality of users, a list that identifies types of items that are indicated as of interest to the user;
   determining, from the lists that indicate types of items that are indicated as of interest to the plurality of users, a particular item that is indicated as of interest to the plurality users;
   receiving, for each of the plurality of users, reservation information that indicates a particular geographic area and a corresponding time that the user is scheduled to visit the particular geographic area;
   determining, from the reservation information, that each of the plurality of users is scheduled to visit the particular geographic area at a particular time period;
   identifying a facility physically located in or within a threshold distance of the particular geographic area and from which a user may obtain the particular item that is indicated as of interest to the users;
   determining that the particular item is not presented in a particular area of the facility at the particular time period; and
   in response to determining that the particular item is not presented in a particular area of the facility at the particular time period, providing an instruction to a robot at the facility that causes the robot to place the particular item in the particular area of the facility before the particular time period.

16. The medium of claim 15, determining, from the lists that indicate types of items that are indicated as of interest to the plurality of users, a particular item that is indicated as of interest to the plurality users comprises:
   determining that a particular type of item is indicated as of interest to a threshold number of the plurality users; and
   determining that the particular item corresponds to the particular type of item.

17. The medium of claim 15, wherein determining, from the reservation information, that each of the plurality of users is scheduled to visit the particular geographic area at a particular time period comprises:
   determining that the plurality of users is scheduled to visit a second facility at the particular time; and
   determining a geographic area corresponding to the second facility as the particular geographic area.

18. The medium of claim 15, wherein determining that the particular item is not presented in a particular area of the facility at the particular time period comprises:
   obtaining presentation information that indicates items that are presented in the particular area of the facility at the particular time period; and
   determining from the presentation information that the particular item is not presented in the particular area of the facility at the particular time period.

19. The medium of claim 15, wherein the reservation information indicates one or more theme park rides that the user has made a reservation to ride at the corresponding time.

20. The medium of claim 15, wherein the reservation information indicates one or more restaurants that the user has made a reservation to dine in at the corresponding time.

* * * * *

UNITED STATES PATENT AND TRADEMARK OFFICE
CERTIFICATE OF CORRECTION

PATENT NO. : 10,424,003 B2
APPLICATION NO. : 15/255949
DATED : September 24, 2019
INVENTOR(S) : David T. Nguyen, Leeann Chau Tuyet Dang and Matthew Thomas Short Page 1 of 1

It is certified that error appears in the above-identified patent and that said Letters Patent is hereby corrected as shown below:

In the Claims

Column 12, Line 53, Claim 9, after "claim 8," insert -- wherein --;

Column 14, Line 10, Claim 16, after "claim 15," insert -- wherein --.

Signed and Sealed this
Twenty-eighth Day of April, 2020

Andrei Iancu
*Director of the United States Patent and Trademark Office*